United States Patent [19]

Eger et al.

[11] Patent Number: 4,689,849
[45] Date of Patent: Sep. 1, 1987

[54] CONTROL MECHANISM FOR A DOOR OF A MOTOR VEHICLE WITH A RECIPROCATING SAFETY VALVE

[75] Inventors: Georg Eger, Hochdorf/Vaihingen; Rainer Srock, Leonberg, both of Fed. Rep. of Germany

[73] Assignee: Dr. Ing. h.c.F. Porsche AG, Stuttgart, Fed. Rep. of Germany

[21] Appl. No.: 850,004

[22] Filed: Apr. 10, 1986

Related U.S. Application Data

[63] Continuation-in-part of Ser. No. 820,330, Jan. 21, 1986, abandoned.

[30] Foreign Application Priority Data

Jan. 19, 1985 [DE] Fed. Rep. of Germany ....... 3501713
May 29, 1985 [DE] Fed. Rep. of Germany ....... 3519203

[51] Int. Cl.$^4$ .............................................. E05F 5/02
[52] U.S. Cl. ............................................ 16/82; 16/58; 16/84; 16/DIG. 10; 16/DIG. 17; 188/318; 188/322.13
[58] Field of Search ......... 16/84, 51, 58, 66, DIG. 17, 16/DIG. 9, DIG. 10, 84, 82, 85; 296/146, 202; 49/322, 383; 188/318, 322.13, 322.14, 322.15; 251/55; 137/540

[56] References Cited

U.S. PATENT DOCUMENTS

| 2,036,474 | 4/1936 | Hanson ................................... 16/84 |
| 2,117,060 | 5/1978 | Gouse ..................................... 16/84 |
| 2,279,002 | 4/1942 | MacNeil ............................... 137/540 |
| 2,834,039 | 5/1958 | Sosse ....................................... 16/51 |
| 3,212,122 | 10/1965 | Flint ........................................ 16/51 |
| 4,113,071 | 9/1978 | Muller .................................. 296/56 |
| 4,433,759 | 2/1984 | Ichinose ................................. 16/51 |

FOREIGN PATENT DOCUMENTS 2555062 6/1977 Fed. Rep. of Germany .

Primary Examiner—Fred Silverberg

[57] ABSTRACT

A control mechanism for a door of a motor vehicle is suggested that is coupled at a door post on the side of the body so that it can be swung, is actuated via an inside and outside handle and comprises a piston-cylinder unit arranged between the door post and the vehicle door. The unit has a piston provided with passage openings for a pressure medium, the piston interacting with an interior valve that separates two working chamber of the cylinders from one another. The mechanism has an exterior blocking valve controlling the medium flow, this blocking valve being arranged in a control circuit connecting the two working chambers of the cylinder, acting against the flow direction. The blocking valve is controlled by a door handle in such a way that the door can be blocked in at least one intermediate position. The interior valve is held on the piston under the tension of a spring in such a way that when the vehicle door is opened, the passage openings are closed, and when the vehicle door is closed, the passage openings are passable for the medium. The blocking valve is controlled in such a way that, when the door handle is actuated, it takes up a release position, and when the door handle is not actuated, it takes up a closing position in the control circuit.

8 Claims, 7 Drawing Figures

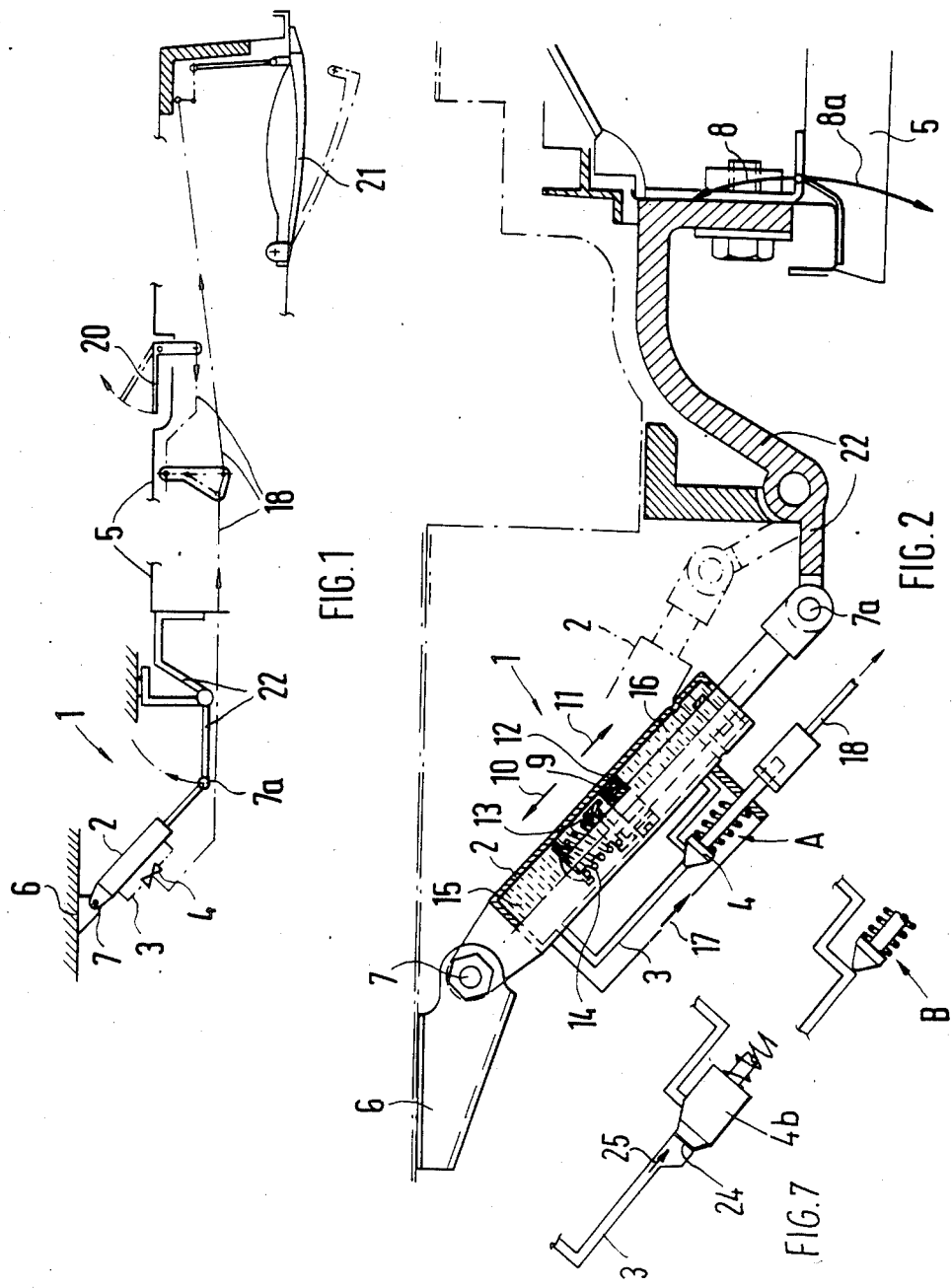

CONTROL MECHANISM FOR A DOOR OF A MOTOR VEHICLE WITH A RECIPROCATING SAFETY VALVE

BACKGROUND AND SUMMARY OF THE INVENTION

This application is a continuation-in-part of a co-pending and commonly assigned application, Ser. No. 820,330, titled "A Control Mechanism for A Door of A Motor Vehicle", filed Jan. 21, 1986, now abandoned.

This invention relates to a control mechanism for the door of a motor vehicle that is hingedly connected to a door post on the side of the vehicle for swinging movement. Such control mechanism is operable via inside and outside door handles and includes a piston-cylinder unit arranged between the door post and the vehicle door, which piston-cylinder unit has a piston provided with passage openings for a pressure medium, the piston interacting with an interior valve separating two working chambers of the cylinder with respect to one another.

From German Published Examined Application (DE-AS) 25 55 062, an arresting mechanism having a piston-cylinder unit is known for flaps, doors and similar parts in motor vehicles. This unit has passage openings in the piston that can be closed by a cover element causing an arresting of the mechanism. It is a disadvantage in the case of this type of design, especially when it is used for motor vehicle doors, that in the case of forces of pressure affecting the flap, i.e., in the case of closing pressures, the pressure of the medium on the cover element becomes so large that this element lifts off the piston, a flow-through of the medium takes place and the flap gives up its arrested position. When outside forces affect the flap, the door or similar part, a certain opening angle can therefore not be maintained by means of such a device.

It is an objective of the invention to develop a control mechanism of the initially mentioned type in such a way that the door can be arrested in any arbitrary intermediate position, but that otherwise it can be opened and closed with any easy motion.

According to the invention, this objective is achieved by providing an exterior blocking valve in a control circuit connecting the two working chambers of the cylinder and actuable against the flow direction of the pressure medium, the blocking valve being controlled by a control mechanism responsive to the door handle operation in such a way that the door can be blocked in at least one intermediate position.

In preferred embodiments of the invention, the interior valve is held on the piston under spring tension in such a way that during opening of the vehicle door the passage openings are closed and during opening of the vehicle door the passage openings are permeable to the medium.

According to an advantageous feature of certain preferred embodiments, the blocking valve is controlled in such a way that it takes up a release position when the door handle is actuated and a closing position when the door handle is not actuated.

In certain preferred embodiments the blocking valve is developed as a safety valve with a control surface acting opposite a pressure column of the control circuit.

Principal advantages achieved by means of the invention consist of the fact that the door, when operated via gripping an inside or outside handle, can be opened and closed with an easy motion, but that, when the operated grip is released, an immediate arresting of the door takes place at any opening angle. This is especially advantageous when vehicles are parked in narrow spaces so that a banging of the door at the adjacently parked vehicle is avoided. Especially also during a stepping-out of the vehicle, a significant pressure may be exercised on the door without any change of position. According to the known mechanism, this would permit a movement of the door which, however, does not take place in the case of the construction according to the invention. The reason is that also significant applications of force in opening direction on the door leave the door unchanged in its position.

However, when the effect of the force on the door becomes so significant that damage may occur, it is provided in certain preferred embodiments of the invention that the blocking valve which, at the same time, is designed as a safety valve, opens and a further swinging of the door becomes possible. A closing of the door from the blocked position, on the other hand, is possible at any time in which case the blocking valve will then be opened via the handle and a circulating of the medium takes place via the control circuit while the interior valve is closed. When, on the other hand, the handle is not used for the closing of the door, the door can also be closed. In this case, by means of the pressure of the medium on the interior valve, this valve is opened, and the medium can flow from one chamber to the other so that the closing of the door is not hindered.

By means of the mechanical and/or electrical connection of the blocking valve with the inside and outside handle of the door, a simple actuating of the valve is created which operates in such a way that at the same time with the operation of the door, a control of the valve takes place so that additional switching devices are not required. The mechanical means for the adjusting are formed by Bowden cables.

Further objects, features and advantages of the present invention will become more apparent from the following description when taken with the accompanying drawings, which show for purposes of illustration only, embodiments constructed in accordance with the present invention;

BRIEF DESCRIPTION OF THE DRAWINGS

FIG. 1 is a diagrammatic representation of a door having a control mechanism comprising a piston-cylinder unit constructed in accordance with a preferred embodiment of the invention;

FIG. 2 is an enlarged sectional top view of the door having the piston-cylinder unit and a control circuit having an exterior blocking valve constructed in accordance with a preferred embodiment of the present invention.

FIG. 7 is a diagrammatic representation of a blocking valve in the control circuit constructed also as a safety valve.

DETAILED DESCRIPTION OF THE DRAWINGS

Figure 3:
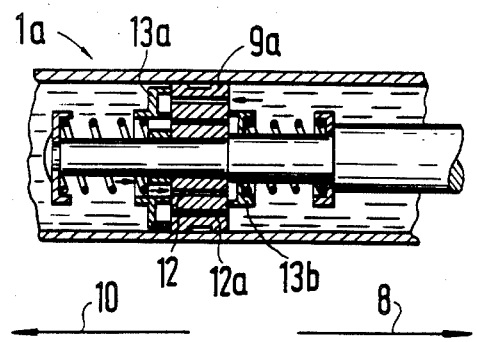
FIG. 3 is a partial sectional view of another embodiment of a control mechanism having a piston-cylinder unit and two interior valves.

The mechanism 1 essentially comprises a piston-cylinder unit 2 that has a control circuit 3 in which a blocking valve 4; 4a; 4b is arranged. This valve may be arranged inside or outside the unit 2. The unit 2 is held between a door 5 and a door post 6 on the side of the vehicle body so that it can be pivoted around vertical shafts 7, 7a in which case the piston rod, by means of a hinge 22, is connected with the door 5. When the door 5 is swung in the direction of the arrow 8a (opening), a piston 9 of the unit 2 is moved in the direction of the arrow 10, and when the door 5 is swung in the direction of the arrow 8 (closing), the piston 9 is moved in the direction of the arrow 11. The piston 9 of the unit 2, according to FIG. 2, has passage openings 12 for a pressure medium, such as gas, hydraulic oil or a similar medium.

In the case of this embodiment according to FIG. 2, the openings 12 are exposed and closed by an interior valve 13 controlled by a spring 14 as a function of the movement of the door. The fluid line of the mechanism 1 forming the control circuit 3, with its inlet and outlet leads into the working chambers 15 and 16 of the cylinder which are divided by the piston 9. The blocking valve 4 is arranged in the control circuit 3 so that it acts against the flow direction 17. It can be moved into a closing position A and into a release position B as a function of the operating of the door handle 20, 21 via mechanical control means 18 or via electrical control means 19 (FIG. 6).

The blocking valve 4; 4a; 4b is connected with the inside handle 20 and the outside handle 21 of the door via mechanical control means 18 which may be formed by sheathed or Bowden cables. The blocking valve 4 can be adjusted via each handle 20 and 21 to the release position B and to the closing position A (FIG. 2).

Figure 6:
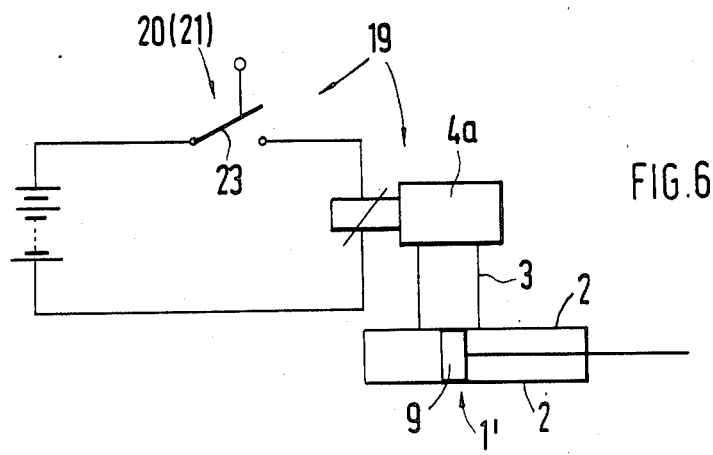
FIG. 6 is a diagrammatic representation of an electric control of the exterior blocking valve in the control circuit construction according to FIG. 2.

According to the embodiment of FIG. 6, the mechanical control means 18 of FIGS. 1 and 2 are replaced by electrical control means 19. Via the door handles 20 and 21, for example, a switch can be actuated by means of which, for example, a magnetic valve is controlled which represents the blocking valve 4a.

According to FIG. 7, the blocking valve 4b is at the same time designed as a safety valve. It has a control surface 24 which is aimed at the pressure column 25 in the control circuit 3 and serves to provide a positive counter pressure under certain operating conditions described below.

Figure 4:
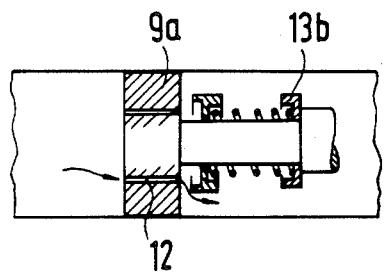
FIGS. 4 and 5 depict positions of the interior valves during the opening and closing of the door according to the embodiment of FIG. 3.
Figure 5:
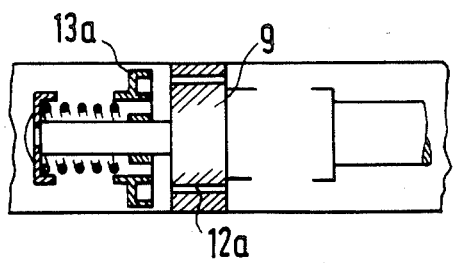

In another embodiment according to FIG. 3, a spring-loaded valve 13a and 13b is provided on both sides of the piston 9a. These valves have the effect that during the opening process of the door 5, the piston 9a moves in the direction of the arrow 10, in which case the valve 13b lifts itself from its seat on the piston 9a and exposes the passage openings 12 (FIG. 4). When no strong pressure is exercised on the door 5 any longer, the door 5 is held in its opened position. An easy-motion adjustment will now no longer be possible, when the passage openings 12 are closed via the valve 13b. When the door 5 is closed, the valve 13a is lifted off the piston 9 so that the passage openings 12a are exposed. By means of an adaptation of the springs to the valves 13a and 13b, an easy-motion opening and closing is achieved and it is achieved that the door is arrested in intermediate positions during the opening, also when subjected to pressure.

The method of operation of the mechanism according to the embodiment of FIGS. 1, 2 and 6 is as follows. During the opening of the door 5 from the inside via the handle 20 and from the outside via the handle 21, the respective handle is pulled into the dash-dotted position. In the process, via the control means 18; 19, the blocking valve 4 is pulled from its closing position A into the release position B in the control circuit 3. As a result, the two working chambers 15 and 16 are connected with one another while the medium can pass through, so that the piston 13 corresponding to the door motion carriers out a motion in the direction of the arrow 10. During this process, the passage openings 12 are closed by the valve 13. The medium is pressed from the chamber 15 via the opened control circuit 3 into the other chamber 16. When the handles 20, 21 are let go, these again take up their starting positions (solid lines). As a result, the blocking valve 4; 4a; 4b is closed and the flow-through of the medium and thus a further motion of the door in opening direction is stopped. The door 5 can therefore be immediately arrested in various intermediate positions by simply releasing the handles 20, 21.

So that no damage occurs when the door that is in blocked condition is opened further by force, the safety valve is provided (FIG. 6). In the case of a certain pressure on the door, this valve 4a opens the control circuit 3 so that a further swinging motion of the door is ensured.

For the easy closing of the door 5, the handle 20 or 21 is actuated so that the blocking valve 4, 4a is opened again and a passage of the medium is made possible. An easy closing of the door 5 is also possible without actuating the handle 20 and 21. By means of the movement of the piston 9 in the direction of the arrow 11, the medium in the chamber 16 is pressed into the passage openings 12 against the valve 13. This valve 13, against the tension of the spring 14, lifts off its seat on the piston 9 and releases the openings 12, so that the displaced medium can enter the other chamber 15.

Although the present invention has been described and illustrated in detail, it is to be clearly understood that the same is by way of illustration and example only, and is not to be taken by way of limitation.

We claim:
1. A control mechanism for a motor vehicle door of the type which is swingably linked to a vehicle body door post and includes interior and exterior door handles, said control mechanism comprising:
   a piston-cylinder unit arranged between the door post and the vehicle door for dampering door opening and closing movements, said piston-cylinder unit exhibiting passage opening means and communicating two working chambers of opposite effective pressure surfaces of the piston-cylinder unit and interior valve means controlling the passage opening means in response to relative movement of the vehicle door and door post,
   and control circuit means connecting the two working chambers separately from the passage opening means, said control circuit means including blocking valve means controlled by the door handles in such a way that the door can be blocked in at least one intermediate position,
   wherein said blocking valve means is reciprocable against a biasing force between a release position when said door handle is actuated and a closing position when said door handle is not actuated;

said blocking valve means including a substantially flat control surface;

said control circuit means including a widened portion with a diameter wider than a remaining portion of said control circuit means and substantially equal to the diameter of said control surface, said widened portion forming a pressure column means for reciprocating said blocking valve means to said release position when there is excessive pressure in said pressure column means.

2. A mechanism according to claim 1, wherein the interior valve means is held on the piston under the tension of a spring in such a way that during the opening of the vehicle door, the passage openings are closed and during the closing of the vehicle door, the passage openings are permeable for the medium.

3. A mechanism according to claim 1, wherein the blocking valve means is connected by mechanical and/or electrical control means with the inside handle and the outside handle of the door.

4. A mechanism according to claim 1, wherein the piston of the mechanism on each side has one valve that causes a passage of the medium as a function of the pressure during the opening and the closing of the door.

5. A mechanism according to claim 1, wherein said blocking valve means are connected to the vehicle door handles so as to automatically block the control circuit to block the door in position when the door handles are released.

6. A mechanism according to claim 5, wherein said blocking valve means are connected to the vehicle door handles so as to automatically connect the working chambers when the door handles are actuated.

7. A mechanism according to claim 1, wherein said blocking valve means are connected to the vehicle door handles so as to automatically connect the working chambers when the door handles are actuated.

8. A mechanism according to claim 1, wherein a spring supplies said biasing force.

* * * * *